United States Patent [19]

Bergin

[11] 3,804,622

[45] Apr. 16, 1974

[54] METHODS OF PRODUCING HALFTONE POSITIVE FILMS

[75] Inventor: Michael J. Bergin, Bayside, N.Y.

[73] Assignee: Intaglio Service Corporation, Long Island City, N.Y.

[22] Filed: Dec. 14, 1972

[21] Appl. No.: 315,030

[52] U.S. Cl............................ 96/38, 96/41, 96/44, 96/45, 96/46
[51] Int. Cl.................................................. G03f 5/00
[58] Field of Search................ 96/38, 41, 46, 44, 45

[56] References Cited
UNITED STATES PATENTS

| | | | |
|---|---|---|---|
| 3,287,131 | 11/1966 | Jemseby................................. | 96/38 |
| 3,129,099 | 4/1964 | Consaul et al......................... | 96/45 |
| 2,662,455 | 12/1953 | Freund.................................. | 96/45 |

Primary Examiner—Roland H. Smith
Assistant Examiner—Edward C. Kimlin
Attorney, Agent, or Firm—Sandoe, Hopgood & Calimafde

[57] ABSTRACT

A method of producing halftone positive films for use in preparing gravure cylinders or plates for use in gravure printing in which selected line copy of the original copy is photographed on a photosensitive film which is developed to produce a film carrying a sharp negative image, from which a film carrying a developed sharp positive image may be produced. From either of these films a film carrying a developed spread positive image and a film carrying a developed spread negative image may be produced.

According to the invention, if a photosensitive film is exposed, first through a film carrying a sharp image, negative or positive, and then through a film carrying a spread image of opposite polarity, i.e., positive or negative, respectively, and through a very fine negative halftone screen, a very fine halftone screen pattern will be produced within the unexposed narrow border areas surrounding the margins of the sharp image which result from the difference in dimensions between the sharp and spread images. This very fine screen pattern results in extremely sharp edges of the image produced in the developed film.

10 Claims, 21 Drawing Figures

METHODS OF PRODUCING HALFTONE POSITIVE FILMS

This invention relates to methods of producing halftone positive films for use in preparing gravure cylinders or plates for use in gravure printing.

Such cylinders and plates are usually made of copper or faced with a layer of copper. In preparing such cylinders or plates for gravure printing, the copper printing surface is coated with a light sensitive gelatine to which a desired latent image is usually transferred by exposure to light through a halftone positive screen in conjunction with a film carrying a continuous tone positive image. The latent image is then developed and etched into the copper surface by methods well known in the art to form an intaglio image therein.

Prints made from such cylinders and plates have been found objectionable in that the edges of depicted objects, and particularly the edges of printed letters or numerals, are frequently jagged or saw-toothed in outline and appear fuzzy rather than sharp and smooth as is desirable.

It is an object of the present invention to provide methods of making halftone positive films which when used in the usual manner for preparing gravure cylinders or plates for use in gravure printing will yield prints in which such edges are sharper than those hitherto produced by conventional methods.

Other objects and advantages of the invention will appear hereinafter.

The method of the invention is illustrated diagrammatically in the accompanying drawings in which.

Figure 1:
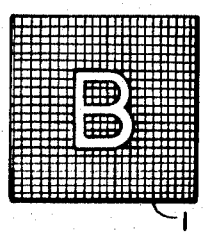
FIG. 1 is a plan view of a film carrying a sharp negative image as produced by Step 1 hereinafter described.

In FIGS. 4A to 12A inclusive, the thickness of the films and halftone screens shown therein is exaggerated for clarity, it being understood that, as explained hereinafter, the actual film thicknesses are of the order of 0.004 inch to 0.007 inch. Therefore, although these figures are described as "sectional views", the conventional cross-hatching is omitted because its use would be confusing.

One of the most useful aspects of the present invention has to do with the processing of original copy which includes what is known in the trade as "line copy", i.e., copy which consists of relatively narrow lines or lettered text where it is desired that the lines or the edges of the letters be sharp in the final prints. In advertisements, for example, such line copy is usually combined with other copy such as a photograph or art work of various kinds. Of special interest and importance are cases where, as is frequently the case in advertisements, it is desired that the line copy such as lettered text should appear in white against a darker background. The method of the present invention, therefore, has to do primarily with the processing of those selected areas of the original copy which consist of or include line copy.

It will be understood that in all cases hereinafter described in which two or more films are assembled for exposure, accurate register is of extreme importance. All film used in the practice of the invention should, therefore, be punched to provide registration holes (not shown) adapted to fit registration pins of a suitable frame in which the films are assembled for processing.

According to the invention the selected line copy of the original copy is first photographed on photosensitive film which is developed to produce a film carrying a sharp negative image. From this film may be produced by conventional methods: (1) a film carrying a developed sharp positive image, (2) a film carrying a developed "spread" positive image, and (3) a film carrying a developed "spread" negative image. As hereinafter explained, a "spread" image, as this term is used in the trade, is an enlarged image in which the dimensions of the lines or areas of the original sharp image are increased by an equal amount around all borders of the image.

Further, according to the invention, a photosensitive film is exposed, first through a film having a developed sharp image, either positive or negative, and then through a film having a developed spread image of opposite polarity, i.e., negative or positive, respectively. As used in this specification, the phrase "image of opposite polarity" means a reversed image, i.e., a negative image is of opposite polarity to a positive image, and vice versa.

When a film carrying a developed sharp image is in register with a film carrying a developed spread image of opposite polarity for either successive of simultaneous exposure onto a photosensitive film, it will be understood that there will be a narrow transparent border area surrounding the margins of the sharp image resulting from the difference in dimensions between the sharp and spread images. Therefore, if a very fine halftone screen such as a 300 line screen, for example, is assembled therewith at the time of exposure, it will be understood that a very fine halftone screen pattern will be produced within the said border area. This very fine screen pattern results in extremely sharp edges of the image produced in the developed film.

In the following portions of the specification two alternative procedures are described as specific examples of the practice of the invention. In the first, a film carrying a sharp negative image is used in combination with a film carrying a spread positive image. In the second, a film carrying a sharp positive image is used in combination with a film carrying a spread negative image.

In both examples, provision is made for including a film carrying a continuous tone image of the original copy other than the selected line copy, together with a normal halftone screen, such as a 150 to 200 line magenta screen, in order to impress a halftone image on the photosensitive film.

EXAMPLE 1

STEP 1. As the first step, the selected line copy of the original copy is photographed on a photosensitive film which is developed to produce a film 1 carrying a sharp negative image thereon as shown in FIG. 1.

STEP 2. From this sharp negative film a film 2 carrying a so-called "spread" positive image is made. By "spread" positive image, as this term is used in the trade, is meant an enlarged positive image in which the dimensions of the lines or the areas of the original sharp negative image are increased by an equal amount around all borders of the image. For purposes of this step, any of various techniques known in the art for making a spread image may be used, but I prefer to use a camera known as the Klimsch-Variomat manufactured and sold by Klimsch & Co. of Frankfurt, Germany. In using such a camera, an adjustment such as to produce a "spread" of about 0.002 inch is adequate for most purposes, although a spread of as little as 0.001 inch or as much as 0.005 inch may be required for special circumstances. That is, if the adjustment is 0.002 inch the width of lines or areas of the negative image would be increased by 0.002 inch along all of its borders.

Figure 2:
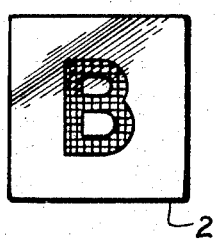
FIG. 2 is a plan view of a film carrying a spread positive image as produced by Step 2 hereinafter described.
Figure 3:
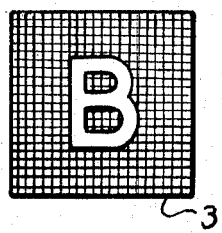
FIG. 3 is a plan view of a film carrying a spread positive image as produced by Step 3 hereinafter described.

Thus, by this step, the image of the sharp negative of Step 1 is photographed onto a photosensitive film 2 and the film is developed to provide the desired spread positive image. As shown in FIG. 2, the enlargement of the letter "B" is somewhat exaggerated for purposes of illustration. For purposes of this step, it is preferred to use relatively thin film in the camera, as for example, film of approximately 0.004 inch thickness. For all other purposes in carrying out the method of the invention film of 0.007 inch may be used.

STEP 3. From the above described film carrying the spread positive image produced by Step 2, a film 3 having a spread negative image thereon is now made by exposing a photosensitive film through the spread positive in contact therewith and then developing the film 3, all by conventional techniques.

Figure 4:
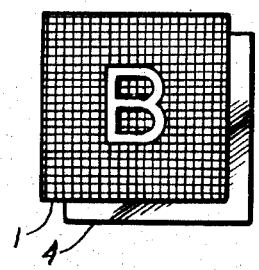
FIGS. 4 and 4A are perspective and exploded sectional views respectively, illustrating an assembly used in Step 4 as hereinafter described.
Figure 4A:
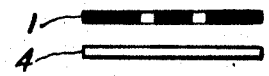

STEP 4. The film 1 carrying the sharp negative image as produced by Step 1 is now assembled with a photosensitive film 4 as shown in FIGS. 4 and 4A, it being understood that the two films are assembled in contact, but are illustrated as spaced apart in FIGS. 4 and 4A merely for clarity. As shown in FIG. 4A, the background part of the negative 1 is opaque, and the part which forms the letter "B" is transparent. This assembly is then exposed to light, but the exposed photosensitive film 4 carrying the latent positive image is not developed.

Figure 5:
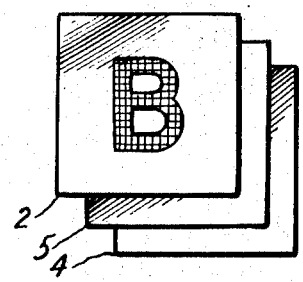
FIGS. 5 and 5A are similar views illustrating an assembly used in Step 5 as hereinafter described.
Figure 5A:
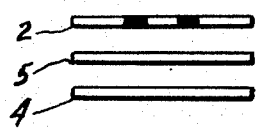

STEP 5. A pack is now assembled as shown in FIGS. 5 and 5A. As shown, the pack consists of the exposed but undeveloped film 4, a film 5 carrying a developed continuous tone positive image and the film 2 carrying the spread positive image as produced by Step 2. The film carrying the continuous tone positive image used in this step is made from the original copy by conventional techniques. This assembly is then exposed to light (bump flash exposure), but the exposed photosensitive film 4 is not developed. As a result of Step 5, the film 4 now carries a latent negative image of the "spread" letter "B" superimposed on the latent positive image resulting from Step 4. But since the dimensions of the negative image of the "spread" letter "B" are greater than those of the positive image by 0.002 inch, for example, there will be an unexposed border 0.002 inch wide surrounding the margins of the image. The film also carries a latent negative image of the continuous tone positive image carried by film 5.

Figure 6:
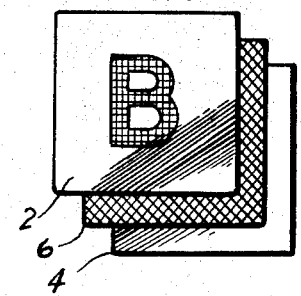
FIGS. 6 and 6A are similar views illustrating an assembly used in Step 6 as hereinafter described.
Figure 6A:
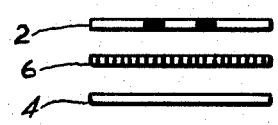

STEP 6. A pack is now assembled as shown in FIGS. 6 and 6A. As there shown, the pack consists of the exposed but undeveloped film 4, a negative halftone screen 6, and the thin base film 2 having thereon the spread positive image as produced by Step 2. For purposes of this step, it is preferred to use a 150 to 200 line magenta screen angled at the standard angle for the color being processed, as for example, for black, at 45° to the horizontal. After this pack is assembled, it is exposed to light (wall exposure), but the exposed photosensitive film 4 is not developed. As a result of Step 6, the film 4 now carries a latent halftone screen pattern over all areas not blocked out by the spread positive image of film 2.

Figure 7:
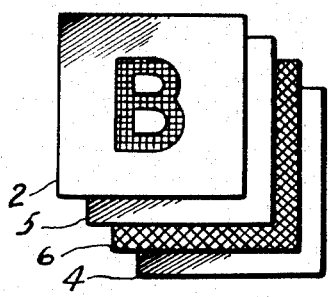
FIGS. 7 and 7A are similar views illustrating an assembly used in Step 7 as hereinafter described.
Figure 7A:
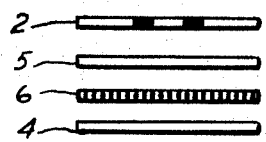

STEP 7. A pack is now assembled as shown in FIGS. 7 and 7A. As there shown, the pack is similar to the pack shown in FIGS. 6 and 6A except that the continuous tone positive 5 as used previously in Step 5 is inserted between the film 2 having the spread positive image thereon and the exposed but undeveloped film 4. After the pack is assembled, it is exposed to light (general exposure), but the exposed photosensitive film is not developed. As a result of Step 7, the film 4 now carries a latent halftone image created from the continuous tone image of film 5 superimposed on the previous latent images. The narrow unexposed borders surrounding the margins of the image of letter "B" remain unexposed.

Figure 8:
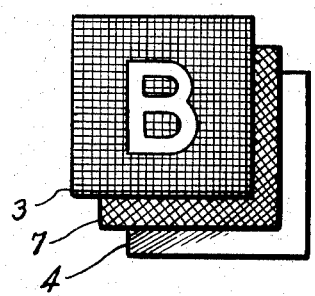
FIGS. 8 and 8A are similar views illustrating an assembly used in Step 8 as hereinafter described.
Figure 8A:
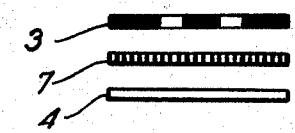

STEP 8. A pack is now assembled as shown in FIGS. 8 and 8A. As there shown, the pack consists of the exposed but undeveloped film 4, a negative halftone screen 7 of greater fineness than the screen 5 and the film 3 carrying the spread negative image produced by Step 3. Preferably, a very fine screen such as a 300 line screen is used for this purpose. The assembled pack is then exposed to light. As a result of Step 8, the narrow previously unexposed borders surrounding the margins of the image of letter "B" will be exposed through the 300 line negative screen to form a 300 line screen pattern throughout the narrow border areas. The film 4 is now developed to produce a halftone negative. This halftone negative is then assembled in contact with a photo-sensitive film and exposed and developed to produce the desired final halftone positive.

The extremely fine 300 line screen pattern which now surrounds the borders of the positive image results in clear cut, sharp edges of prints made therefrom.

EXAMPLE 2

According to a modified form of the invention, Steps 1, 2 and 3 are carried out in the manner previously described to produce:

1. A film 11 having a developed sharp negative image thereon made as described in former Step 1.
2. A film having a developed spread positive image thereon as described in former Step 2.
3. A film 13 having a developed spread negative image thereon as described in former Step 3. to use a screen angled at to light.

Figure 9:
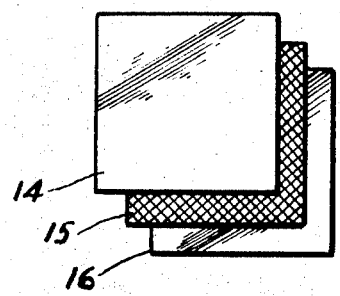
FIGS. 9 and 9A are similar views illustrating a modified assembly used in Step 7 of a modified form of the process as hereinafter described.
Figure 9A:
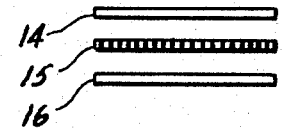

STEP 4. A pack is now assembled as shown in FIGS. 9 and 9A. As there shown, the pack consists of a film 14 carrying a continuous tone positive image thereon, a negative halftone screen 15 and a photosensitive film 16. The continuous tone positive image used in this step has been made from the original copy by conventional techniques. For purposes of this step, it is preferred to usea 150 to 200 line magenta screen agnled at the standard angle for the color being processed, as for example, for black, at 45° to the horizontal. After this pack is assembled, it is exposed to ligth. TGHT. The film 16 is then developed to produce a halftone negative image.

Figure 10:
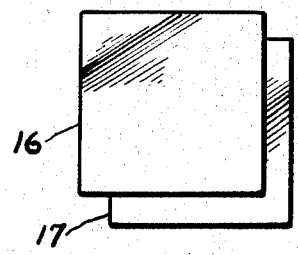
FIGS. 10 and 10A are similar views illustrating an assembly used in Step 5 of the modified form of the process as hereinafter described.
Figure 10A:
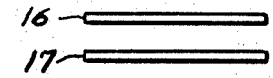

STEP 5. A pack is now assembled as shown in FIGS. 10 and 10A. As there shown, the pack consists of the film 16 carrying the developed halftone negative image produced by Step 4, and a photosensitive film 17. The assembled pack is then exposed to light but film 17 now carrying a latent halftone positive image is not developed.

Figure 11:
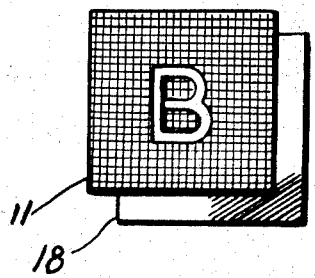
FIGS. 11 and 11A are similar views illustrating an assembly used in Step 6 of the modified form of the process as hereinafter described.
Figure 11A:
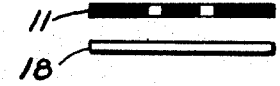

STEP 6. A film 18 having a developed sharp positive image thereon is now made from the film 11 by conventional methods. That is, as shown in FIGS. 11 and 11A, the film 11 is assembled in contact with a photosensitive film 18 and exposed and developed. For purposes of this step, it is preferred to use a relatively thin film, as for example, film of approximately 0.004 inch thickness.

Figure 12:
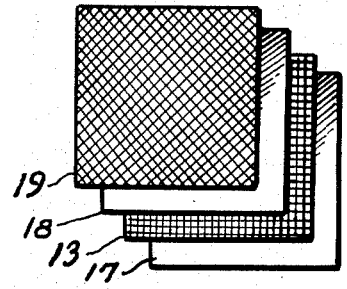
FIGS. 12 and 12A are similar views illustrating an assembly used in Step 7 of the modified form of the process as hereinafter described.
Figure 12A:
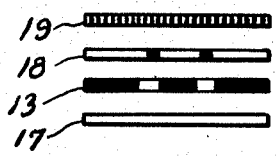

STEP 7. A pack is now assembled as shown in FIGS. 12 and 12A. As there shown, the pack consists of a very fine negative halftone screen 19 as, for example, a 300 line screen, a film 18 carrying the developed sharp positive image as made by Step 6, a film 13 carrying the developed spread negative image as made by Step 3, and the exposed film 17 carrying the undeveloped latent halftone positive image resulting from Step 5. The assembled pack is then exposed to light. It will be noted that, as shown in FIG. 12A, the placing of the sharp positive image of film 18 above the spread negative image of film 13, a narrow border 0.002 inch wide surrounds the image for exposure through the screen 15, thus producing a fine 300 line screen pattern within the border. The exposed film 17 is now developed to produce the desired final halftone positive.

What is claimed is:

1. Method of producing halftone positive films for use in preparing gravure cylinders or plates for use in gravure printing which includes the steps of photographing selected line copy of the original copy and producing therefrom a film carrying a developed sharp image and a film carrying a developed spread image of opposite polarity, and exposing a photosensitive film, first through said film carrying the developed sharp image, and then through said film carrying the developed spread image of opposite polarity, and through a very fine halftone screen, whereby a very fine halftone screen pattern is produced within the unexposed narrow border areas which surround the margins of the image which result from the difference in dimensions between the said sharp and spread images.

2. Method according to claim 1 in which said developed sharp image is a negative image, and said developed spread image is a positive image.

3. Method according to claim 1 in which said developed sharp image is a positive image, and said developed spread image is a negative image.

4. Method according to claim 2 in which the exposure of said photosensitive film through said negative sharp image, and the exposure of said photosensitive film through said positive spread image are separate exposures which take place successively, and are followed by exposure of said photosensitive film through said very fine halftone screen.

5. Method according to claim 3 in which the exposure of said photosensitive film through said positive sharp image, and the exposure of said photosensitive film through said negative spread image, and the exposure of said photosensitive film through said very fine halftone screen take place simultaneously.

6. Method according to claim 1 in which the dimensions of the lines or areas of the surface of the original sharp image are increased by from 0.001 inch to 0.005 inch around all borders of the image.

7. Method according to claim 1 including the step of exposing said photosensitive film through a film carrying a continuous tone image and through a halftone screen of less degree of fineness than said very fine halftone screen.

8. Method according to claim 7 in which said very fine halftone screen is a 300 line screen, and said halftone screen of less degree of fineness is a 150 line screen.

9. Method of producing halftone positive films for use in preparing gravure cylinders or plates for use in gravure printing which includes the steps of photographing selected line copy of the original copy and producing therefrom a film carrying a developed sharp negative image, a film carrying a developed spread positive image and a film carrying a developed spread negative image, and exposing a photosensitive film, first through said film carrying said developed sharp negative image, then through said film carrying said developed spread positive image, then simultaneously through said film carrying said developed spread negative image and through a very fine halftone screen, whereby a very fine halftone screen pattern is produced within the unexposed narrow border areas which surround the margins of the image which result from the difference in dimension between the said sharp and spread images.

10. Method of producing halftone positive films for use in preparing gravure cylinders or plates for use in gravure printing which includes the steps of photographing selected line copy of the original copy and producing therefrom a film carrying a developed sharp negative image, a film carrying a developed sharp positive image, and a film carrying a developed spread negative image, and exposing a photosensitive film simultaneously through said film carrying said developed sharp positive image, said film carrying said developed spread negative image, and through a very fine halftone screen, whereby a very fine halftone screen pattern is produced within the unexposed narrow border areas which surround the margins of the image which result from the difference in dimension between the said sharp and spread images.

* * * * *